Nov. 6, 1962  V. POMPER  3,062,301
HYDRAULIC CONTROL SYSTEMS FOR AGRICULTURAL TRACTORS
Original Filed June 24, 1957  7 Sheets-Sheet 5

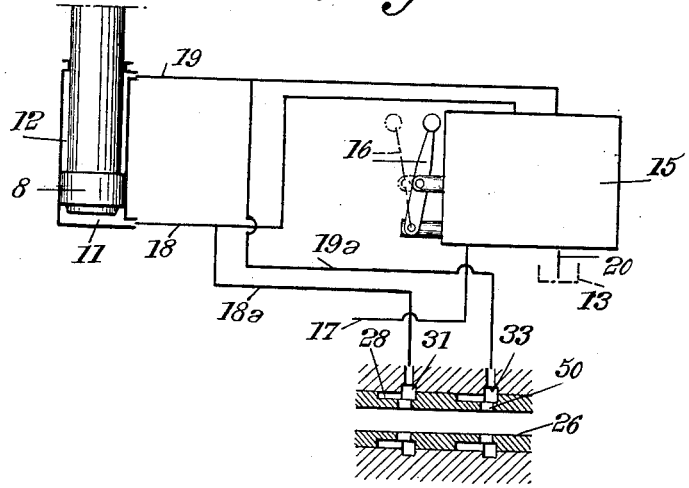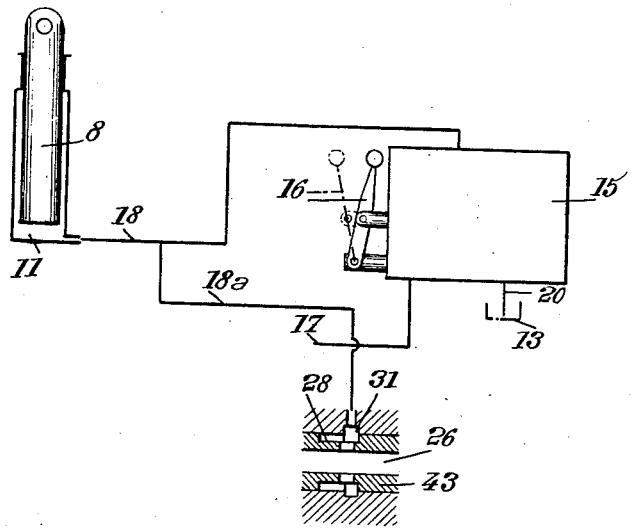

INVENTOR
Victor Pomper
BY
Bailey Stephens Huettig
ATTORNEYS

Nov. 6, 1962 V. POMPER 3,062,301
HYDRAULIC CONTROL SYSTEMS FOR AGRICULTURAL TRACTORS
Original Filed June 24, 1957 7 Sheets-Sheet 7

INVENTOR
Victor Pomper
BY
Bailey, Stephens Huettig
ATTORNEYS

United States Patent Office 3,062,301
Patented Nov. 6, 1962

3,062,301
HYDRAULIC CONTROL SYSTEMS FOR AGRICULTURAL TRACTORS
Victor Pomper, Paris, France, assignor to Societe Industrielle Generale de Mecanique Appliquee S.I.G.M.A., Paris, France, a society of France
Original application June 24, 1957, Ser. No. 667,594, now Patent No. 2,935,850, dated May 10, 1960. Divided and this application Mar. 15, 1960, Ser. No. 15,202
Claims priority, application France July 2, 1956
3 Claims. (Cl. 172—464)

The present invention, which is a division of my co-pending application Ser. No. 667,594, filed June 24, 1957, for "Improvements in Hydraulic Control Systems for Agricultural Tractors," now Patent No. 2,935,850, relates to hydraulic control systems for tractors which include a hydraulic jack capable of lifting and lowering (double acting jack) or allowing to drop (single acting jack) ploughs (or similar implements) pivotally mounted on the tractor about a horizontal axis and capable of resting on the ground through at least one wheel called a gauge wheel. The jack may be operated either by a follow-up device (that is to say such that the driver has merely to place a control member in a given position to cause the jack to bring the plough into the desired position) or by an ordinary control device (that is to say such that the displacement and stopping of the plough in the desired position are directly controlled by the driver).

There are ploughing conditions where the plough is left floating, which means that the piston of the jack is left free to move in its cylinder by connecting with the liquid tank, either both of the active chambers of the jack in the case of a double acting jack, or the active chamber thereof in the case of a single acting jack. The plough is then kept at the desired level by the guage wheel, which is suitably adjusted for this purpose, the ground of course exerting a reaction upon said wheel.

In some cases this reaction of the ground may reach a value so high that it causes the rear wheels of the tractor to skid, due to the increase of the traction effort which is necessary.

In order to prevent skidding of the rear wheels when it begins, it is known temporarily to increase their adhesion on the ground by shifting to said wheels a portion of the weight of the plough, without however lifting it and in such manner that the ground exerts a lower reaction on the wheel supporting the plough. Thus, the load on the rear wheels is increased, the adhesion of said wheels on the ground is increased, and skidding is reduced or stopped. The traction power of the tractor is increased so that it is again able to pull the plough.

It is known to obtain such a transfer of load from the plough to the tractor by making use of means for locally throttling the return conduit through which liquid flows from the output of the pump and from the jack working chamber or chambers back to the tank from which the pump is fed with liquid.

But, in load transfer devices such as known up to this time, said throttling means were operated by means of a control member acting on said means through a resilient transmission, the purpose of such a transmission being to prevent the pressure in the jack working chamber from reaching the value which causes the plough to be lifted from the ground, since the resilient transmission limits the degree of closing of the throttling means.

However, experience has shown that throttling means controlled through a resilient transmission are liable to oscillate in operation and that it is difficult to accurately adjust the spring included in said resilient transmission.

The object of the present invention is to obviate these drawbacks.

For this purpose, according to my invention, the above mentioned throttling means, which are rigid, are operatively connected with the control member through positive means so that to a position of said control member there corresponds a single and well determined position of said throttling means, and means are provided for limiting the pressure in the portion of said discharge conduit upstream of said throttling means to a value lower than that necessary in said jack chamber to cause the jack to lift the plough.

Preferred embodiments of the invention will be hereinafter described with reference to the accompanying drawings given merely by way of example and in which:

FIG. 1 is a diagrammatic elevational view of a tractor provided with a plough mounted as above mentioned.

FIGS. 2 and 3 diagrammatically show two different embodiments of a hydraulic control system according to the invention and for use with a tractor such as shown by FIG. 1, the jack of this system being of the double acting type.

FIG. 4 partly illustrates a modification in which the double acting jack has a piston rod of very large cross section.

FIG. 5 similarly shows an embodiment of the invention in which the jack is of the single acting type.

Figure 1:
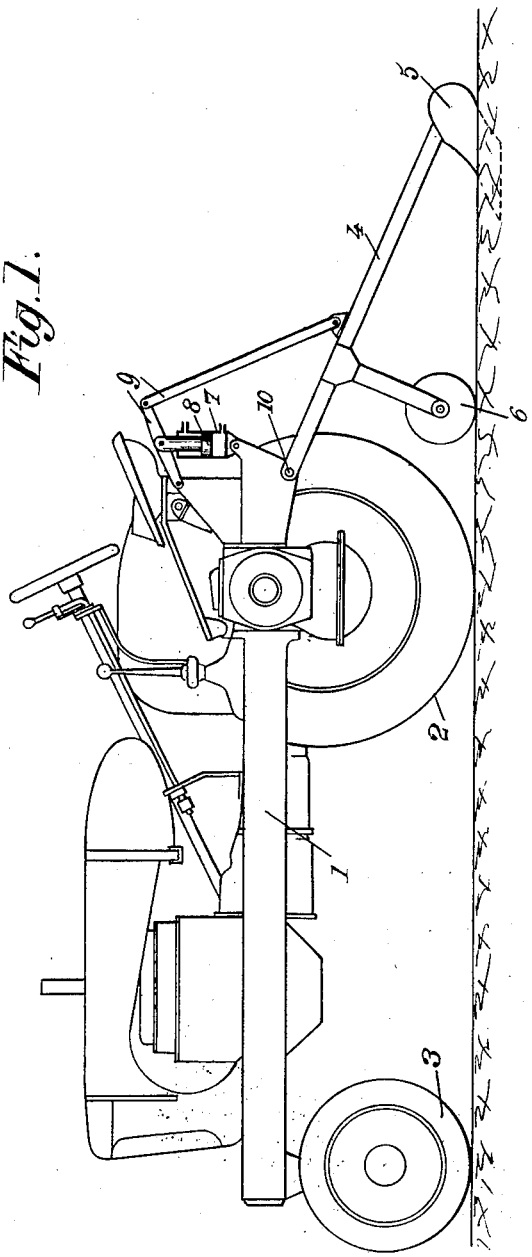

As shown by FIG. 1, tractor 1 includes rear wheels 2 and front wheels 3, and it is capable of pulling a plough 4 comprising a share 5 and a gauge wheel 6. This tractor is provided with a hydraulic control system, the jack of which, essentially constituted by a cylinder 7 and a piston 8 connected with the plough through levers 9, is capable of lifting or lowering the plough by rotation thereof about an axis 10 carried by the tractor.

It will first be supposed that the jack is of the double acting type, that is to say that it includes, on opposite sides of piston 8, two active chambers 11 and 12 (FIG. 2), expansion of one or the other of these chambers causing the plough to be lifted or lowered respectively.

The hydraulic control system includes a liquid tank 13 (for the sake of simplicity, the same tank has been shown at different places on the drawings, at one place in solid lines and at the other places in dot-and-dash lines), a continuously working pump 14 and a control device 15 consisting of a distributing valve device. This device may in particular be a reversing valve of the type described in my U.S. patent application Ser. No. 525,901, filed Aug. 2, 1955, for "Hydraulic Control Systems in Particular for Operating a Tractor Rock Shaft," now Patent No. 2,886,-948, issued May 18, 1959, or in my U.S. patent application Ser. No. 552,536, filed Dec. 12, 1955, now abandoned for "Hydraulic Servo-Motor Systems." The operations of lifting the plough, lowering it or maintaining it at a desired level are performed by means of a lever 16. In order to move the plough up or down, liquid fed from pump 14 to valve device 15 through the pump delivery conduit 17 is sent by said valve device through one of the feed conduits 18 or 19 to one of the chambers 11 and 12 of the hydraulic jack and a corresponding amount of liquid is discharged from the other of said chambers through the other of said conduits 18 or 19 to tank 13, for instance through discharge conduit 20.

The maximum working pressure is determined by a safety discharge valve 21 mounted in delivery conduit 17.

Figure 2:
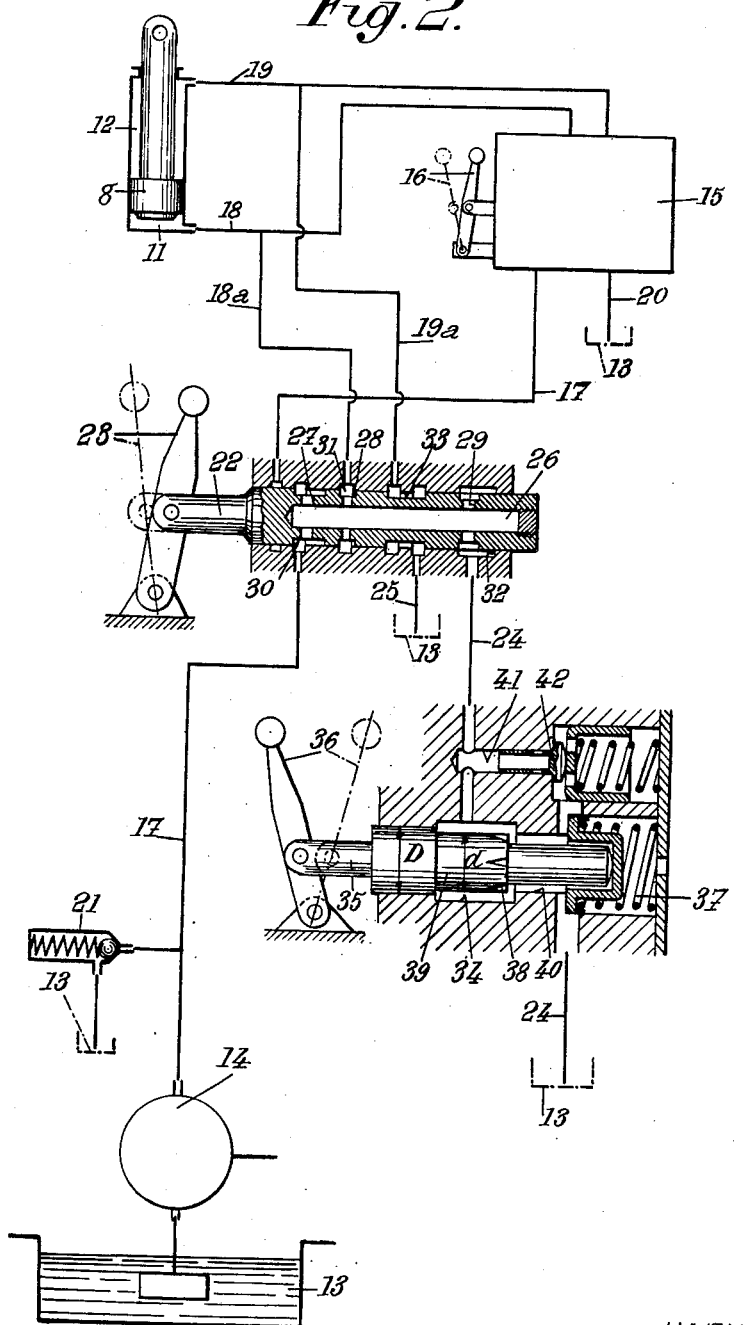

On FIG. 2, valve 21 is shown outside of device 15 for the sake of clarity.

The system further includes an auxiliary distributing valve device capable, in order to place the plough in floating position, of connecting both of the active chambers 11 and 12 and the delivery conduit 17 with discharge conduit 20.

This auxiliary distributing valve device may be constituted by a slide valve 22 controlled by a lever 23.

In working position (lever 23 in the position shown in dot-and-dash lines, FIG. 2), the auxiliary valve 22 permits liquid to flow from pump 14 through said conduit 17 to the main distributing valve device 15. In the floating position (shown by FIG. 2) valve 22 closes the portion of conduit 17 extending between said valve 22 and valve device 15 and connects with tank 13 the chambers 11 and 12 of the jack (through conduits 18, 18a and 19, 19a) and the portion of conduit 17 extending between pump 14 and valve 22.

On the drawing, valve 22 is shown separate from device 15 for the sake of clarity.

The return conduit means for the liquid coming from the active chamber 11 of the jack (expansion of which causes the plough to be lifted) and the return conduit means for the liquid coming from the portion of the pump delivery conduit 17 upstream of valve 22 are combined into a single conduit 24, whereas the discharge conduit means 25 for the liquid flowing from the other chamber 12 of the jack are separate from such single conduit. Furthermore, means are provided for throttling the common discharge conduit 24 so as to increase the pressure upstream of said throttling means and particularly in chamber 11.

For this purpose, valve 22 is provided with a central passage 26 in communication with grooves 27, 28 and 29 formed in said valve and adapted to register with grooves 30, 31 and 32 provided in the cylindrical housing of said valve when valve 22 is in floating position, as shown in solid lines on FIG. 2, grooves 30, 31 and 32 are connected respectively with the portion of the pump delivery conduit 17 upstream of valve 22, with conduit 18a, and with return conduit 24. The communications between the respective grooves of the valve and those of its cylindrical housing are cut off when valve 22 is in working position (lever 23 in the position shown in dot-and-dash lines on FIG. 2). Valve 22 is further provided with a groove 33 capable of connecting conduit 19a with return conduit 25 when said valve 22 is in floating position. Finally, groove 27 connects the upstream and downstream portions of delivery conduit 17 together when valve 22 is in working position.

In return conduit 24, there is provided a chamber 34 in which is mounted a slide valve 35 actuated by means of a lever 36. This slide valve 35 may occupy either a position (that shown on FIG. 2) where said chamber 34 is in communication with both of the portions of conduit 24 located respectively upstream and downstream thereof and a position (corresponding to lever 36 being in the position shown in dot-and-dash lines) where said chamber is cut off from the downstream portion of conduit 24. Advantageously, valve 35 is urged toward the first of these positions by a spring 37.

Slide valve 35 may be arranged so as suddenly to cut off the communication between the above mentioned portions of conduit 24, but it is more advantageous to arrange it in such manner that it gradually reduces the cross section area of the communication passage. For this purpose, use may be made of a conical slide valve or, as shown by FIG. 2, the slide valve may be provided with triangular notches 38 formed on the portion 39 of the slide valve which moves in cylindrical bore 40.

According to my invention, slide valve 35 is positively connected with control lever 36 and means are provided to limit the pressure in chamber 34 to a value such that when valve 35 is fully closed by means of control lever 36 the pressure in the jack chamber 11 cannot reach a value such that the jack lifts the plough of the ground.

Figure 3:
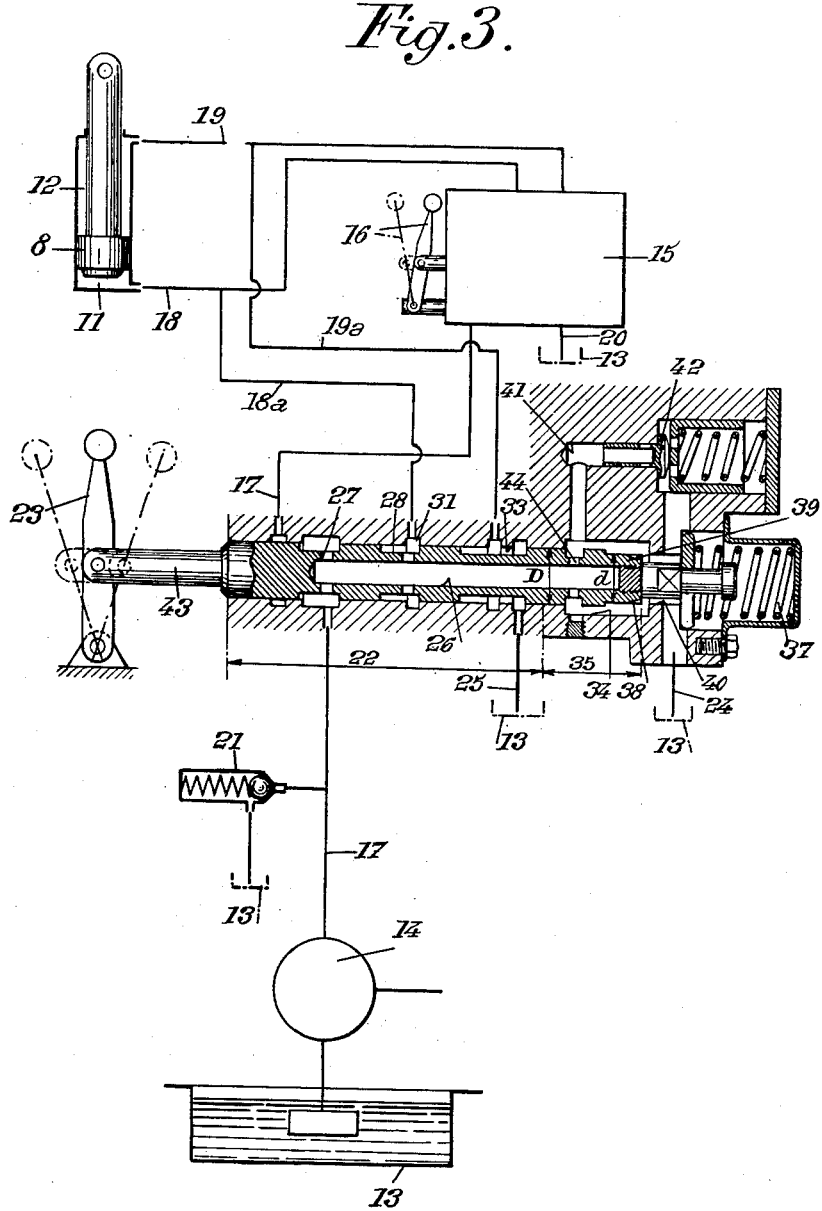

For this purpose, bore 40 may be short-circuited by a passage 41 provided, as shown on FIGS. 2 and 3, with a safety valve 42 adjusted to yield at a pressure lower than the value above mentioned.

Slide valve 35 exerts on lever 36 a reaction substantially proportional to the pressure existing in chamber 34. This result may be obtained as shown by the drawing, by providing the slide valve with two portions of different diameters D and d, so that the differential pressure that results therefrom produces a thrust which tends to increase the cross section of the passage. In the embodiment that is illustrated, the portion of smaller diameter d is 39.

This control device works as follows:

When valve 22 is in working position (position corresponding to lever 23 in dot-and-dash lines), it connects with each other the portions of conduit 17 located respectively upstream and downstream of said valve 22 and it clears conduits 18a and 19a. The jack can then be controlled by means of the lever 16 of the main distributing valve 15.

When valve 22 is in floating position (as shown by FIG. 2), the chamber 12 of the jack is placed in communication with tank 13 through discharge conduit 25, whereas chamber 11 and the upstream portion of delivery conduit 17 are both placed in communication with return conduit 24. Liquid can normally flow through chamber 34 and bore 40 inserted in said return conduit, because slide valve 35 is held by spring 37 in the position shown by FIG. 2.

If the operator feels that the rear wheels of the tractor are skidding, he pivots lever 36 toward the right against the action of spring 37. This causes a gradual throttling of the passage between bore 40 and chamber 34. The pressure in chamber 34 thus gradually rises. This pressure is transmitted to the chamber 11 of the jack through passage 26, groove 31, conduits 18a and 18, and it produces a lifting force which shifts a portion of the load of the plough to the rear wheels 2 of the tractor and prevents or reduces skidding of these wheels, as above explained.

It should be noted that the distributing valve device 15 is of a conventional type which closes conduits 18 and 19, whatever be the position of lever 16, when said device 15 ceases to be fed with liquid through delivery conduit 17. It should be understood that the load transfer pressure can thus be established in chamber 11 whatever be the position given to lever 16, as soon as the operator has stopped conduit 17 by means of valve 22.

As the operator is moving valve 35 toward the right, the pressure in chamber 34 increases and the transfer of load becomes more and more effective. As soon as this pressure reaches the value for which auxiliary valve 42 opens, the liquid flows through the by-pass controlled by said valve 42, this liquid being at the maximum pressure for load shifting.

As soon as the operator releases lever 36, slide valve 35 is automatically returned by spring 37 toward the position shown by FIG. 2. The passage afforded to the liquid coming from the pump is then fully opened. The load transfer effect ceases and the pump freely delivers liquid to the tank without this liquid getting heated.

In the construction of FIG. 2, it has been supposed that valve 22 and valve 35 are separate, but it seems advantageous for constructional reasons and for the facility of operation to combine valve 22 and valve 35 into a single valve member as shown by FIG. 3 where said valve member is designated by reference number 43. On this figure, the parts which have the same function as in the embodiment of FIG. 2 are designated by the same reference numbers.

Lever 23 makes it possible to move valve 43 on either side of the floating position thereof illustrated by the drawing, toward the left to ensure the feed of liquid to control device 15 and toward the right to obtain the load transfer effect. Spring 37 tends to return valve member 43 from this last mentioned position to the floating position but has no action when valve member 43 is located on the left of the floating position.

In order to operate the jack, the operator brings valve member 43 into the left hand position which isolates conduits 18a and 19a and clears the passage through delivery conduit 17, whereby liquid is fed to control device 15.

In order to bring the jack into floating position, the operator brings valve 43 into the position shown by FIG. 3, where the portion of conduit 17 between valve 43 and reversing valve 15 is closed and the other portion of said conduit 17 (between pump 14 and valve 43) is connected, together with conduit 18a, with chamber 34 through central passage 26 and holes 44. This chamber 34 communicates freely with return conduit 24 through bore 40. Simultaneously, conduit 19a is connected with return conduit 25.

In order to obtain load transfer, the operator moves valve 43 toward the right by means of lever 23, which does not modify the connections existing in the floating position but causes the passage between chamber 34 and bore 40 to be throttled, with the same results as above described with reference to the FIG. 2.

Any unnecessary heating if the liquid (oil) is avoided owing to the provision of spring 37, which automatically returns the throttling valve into floating position as soon as the operator releases control lever 23. The pump output and the active chamber or chambers of the jack are then connected without any counter-pressure and the pump feeds liquid without pressure.

Figure 6:
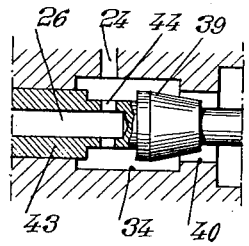
FIGS. 6 and 7 show two different constructions of means for throttling the return conduit.
Figure 7:
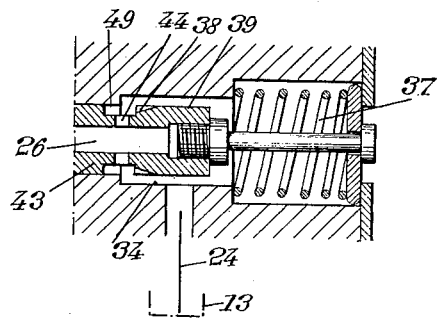

Concerning the portion 39 of slide valve 35 (FIG. 2) or of valve member 43 (FIG. 3), instead of being cylindrical and provided with notches 38, it might be of conical shape, as shown by FIG. 6, in order to ensure a gradual throttling of bore 40. Furthermore, throttling of the passage afforded to the liquid flowing through return conduit 24 may be obtained by pulling valve 43 toward the left, as shown by FIG. 7, in which case notches 38 may be provided on the end face of the groove 49 into which open the holes 44 intended to connect passage 26 with chamber 34.

In what precedes, it has been supposed that the jack is a double acting jack and that its piston rod has a cross section relatively small with respect to the cross section of its cylinder.

But, it should be well understood that the invention applies also to the two following other cases.

In the first of these cases, illustrated by FIG. 4, the jack is still a double acting jack but its piston rod is of relatively large cross section with respect to the cross section of its cylinder. Instead of providing a separate return conduit 25 for liquid from the chamber 12 of the jack which controls the downward movement of the plough, it is then possible to use for this purpose return conduit 24, which is already common to the upsteam portion of conduit 17 and to the other chamber 11 of the jack, provided of course that this last mentioned chamber is of greater cross section than chamber 12. For this purpose, it suffices, as shown by FIG. 4, to connect the groove of slide valve 43 into which conduit 19a opens with the central passage 26 of said valve through a hole 50, the remainder of the system being identical to that of FIG. 3.

In the second case illustrated by FIG. 5, the jack is of the single acting type, that is to say it includes only one active chamber 11 to which liquid is fed, or from which it is allowed to flow through conduit 18. In floating position, it suffices to connect chamber 11 and the pump delivery with the central passage 26 of valve 43. The system is analogous to that of FIG. 3 but considerably simplified by the fact that conduits 19, 19a, 25 and grooves 33 of said FIG. 3 are made unnecessary.

The operation of the system in both of the two last mentioned embodiments (FIGS. 4 and 5) is practically the same as in the case, above described in detailed fashion with reference to FIGS. 2 and 3, of a double acting jack having a piston rod of relatively small cross section. It is therefore unnecessary to repeat this description with reference to FIGS. 4 and 5.

Figure 8:
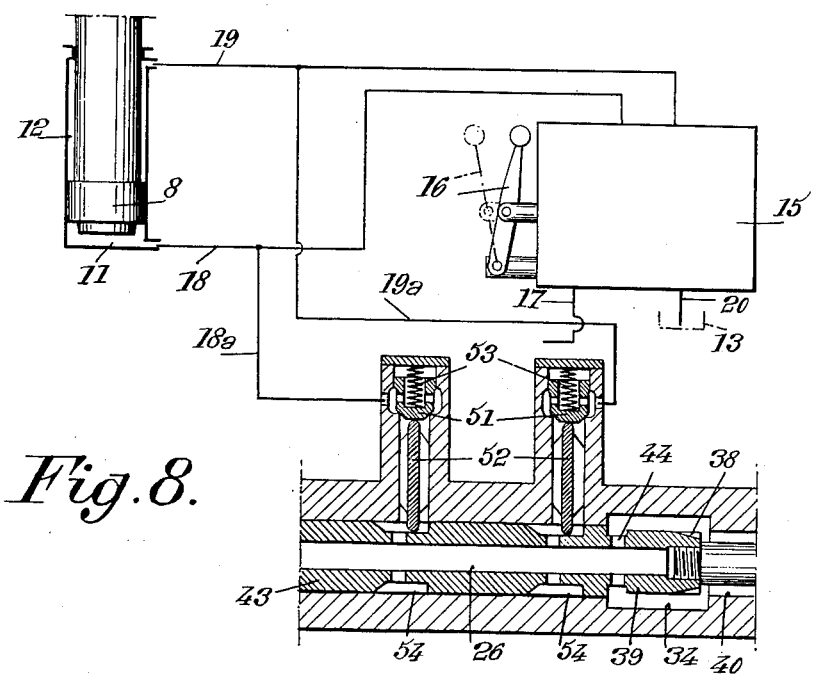
FIG. 8 shows a distributor provided with mechanically controlled auxiliary check valves.

Furthermore, valve member 43 may be provided with a supplementary check valve packing system known in itself. Such a system has been shown on FIG. 8, check valves 51 being controlled by push-pieces 52 which are applied by springs 53 against oblique surfaces 54 provided on valve member 43.

Figure 9:
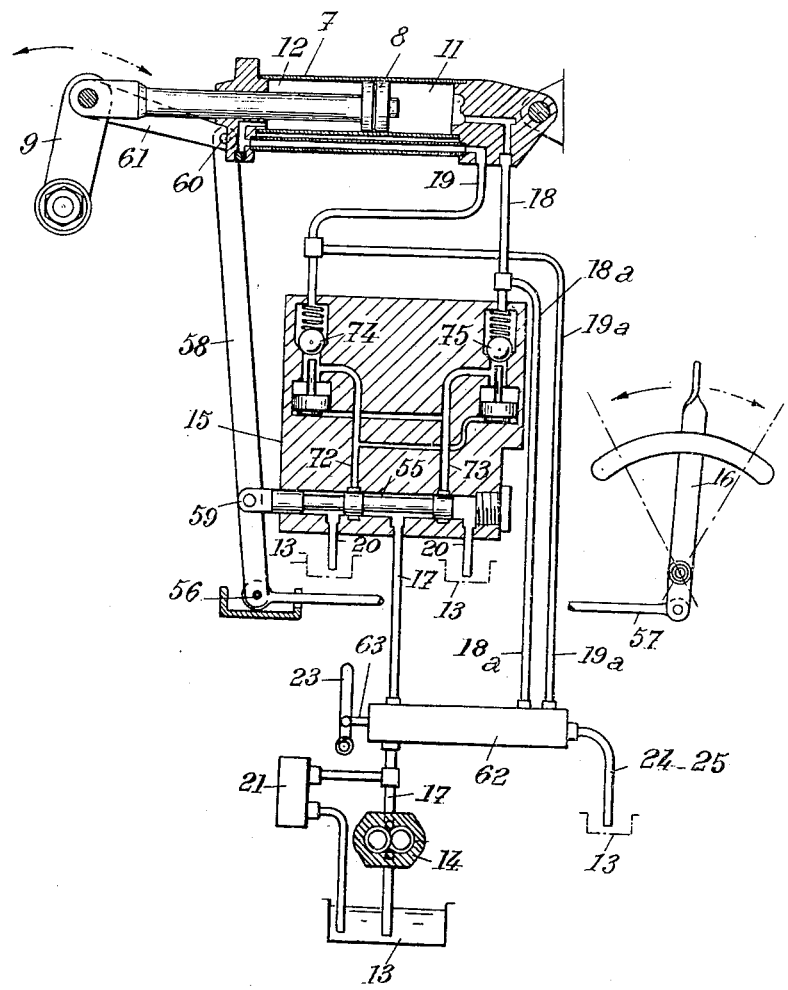
FIG. 9 shows a system according to the invention in which the double acting jack is operated by a follow-up control device.
Figure 10:
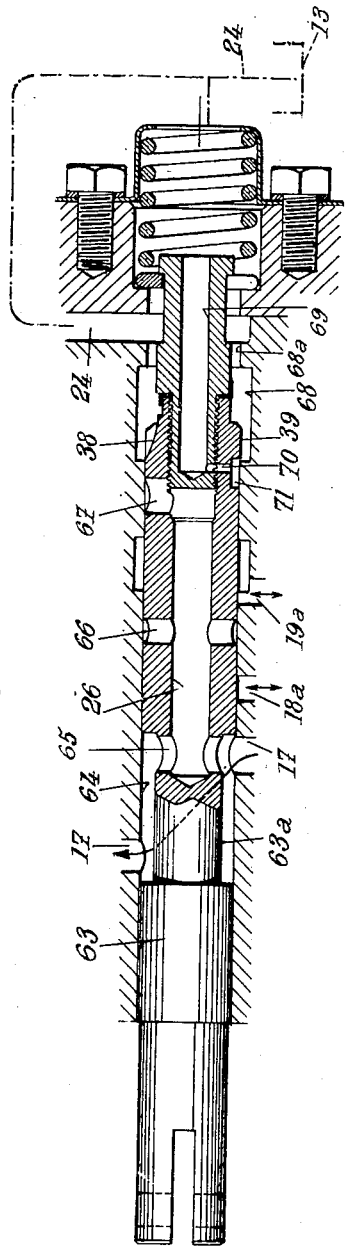
FIGS. 10 and 11 show in axial section the auxiliary distributing valve device of FIG. 9 in two different working conditions respectively.
Figure 11:
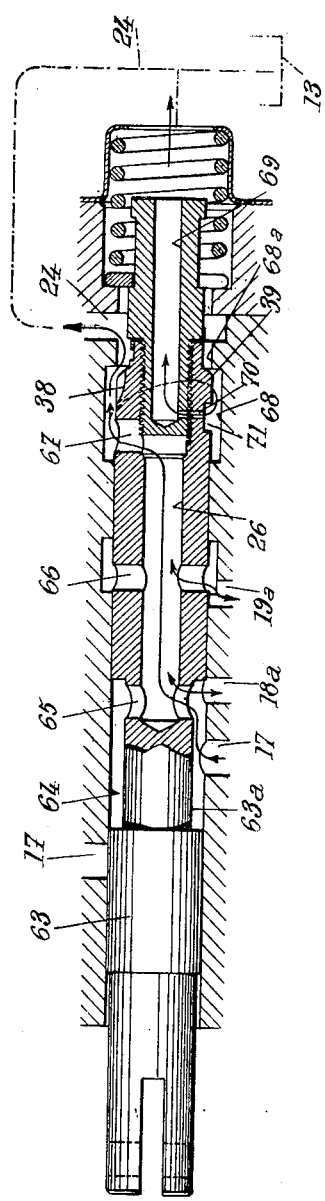

In the construction of FIGS. 9 to 11, pressure limitation, when there is a transfer of the load, is obtained by means of a passage provided with a calibrated orifice and mounted in parallel with the throttled section, said passage being controlled in such manner that it is opened only when the feed of liquid to the main distributing valve device is cut off. In this embodiment of the invention, there is interposed between, on the one hand, the delivery conduit 17 of pump 14, which draws liquid from tank 13, and, on the other hand, conduits 18 and 19 leading to the respective chambers 11 and 12 of the jack, a main distributing valve device 15 including a three positions slide valve 55 and two positively operated check valves 74 and 75.

These valves 74 and 75 are intended to prevent conduit 19 or 18 from being connected with return conduit means leading back to the liquid tank when distributor 55 is out of its middle position without being fed with liquid under pressure through conduit 17.

Of course, pilot valves 74 and 75 may be replaced by a distribution slide valve piloted by slide valve 55, as described in my above mentioned U.S. patent application Ser. No. 525,901.

In the middle position of slide valve 55 that is shown, said slide valve cuts off the delivery conduit 17 of pump 14 from conduits 72 and 73, leading respectively past valves 74 and 75 to conduits 19 and 18; jack 7—8 is thus held in fixed position and the pump delivers its liquid through discharge valve 21. When slide valve 55 is moved toward the right, the liquid delivered by the pump is led to chamber 11 through conduit 73, valve 75, and conduit 18, which causes the plough to be lifted. At the same time, the liquid under pressure in conduit 73 causes valve 74 to be lifted, thus enabling the liquid driven out from chamber 12 of the jack through conduit 19 to be evacuated through conduit 72 toward one of the return conduits 20.

When valve 55 is moved toward the left, the liquid delivered by the pump is led to chamber 12 through conduit 72, valve 74 and conduit 19, which causes the plough to be lowered. At the same time, the liquid under pressure in conduit 72 causes valve 75 to be lifted, so as to enable the liquid driven from chamber 11 through conduit 18 to be evacuated through conduit 73 toward one of the return conduits 20.

Valve device 15 is of the type actuated through follow-up control means. For this purpose, lever 16 acts on slide valve 55 through a rod 57 and a lever 58 hinged at 56 to rod 57, at 59 to slide valve 55 and at 60 to a rod 61 pivoted to piston 8. When lever 16 is moved in the direction of the solid line arrow, lever 58 swings toward the right about point 60 and moves the slide valve 55 of the main distributing valve device toward the right, which, as above stated, causes lever 9 to pivot in the direction of the solid line arrow (whereby the plough is lifted). Lever 58, driven by connecting rod 61, then swings toward the left about axis 56, returning slide valve 55 into the middle position shown by the drawing, which stops lever 9 in the position corresponding to that given to lever 16 by the operator. By moving lever 16 in the opposed direction, a displacement of lever 9 in the opposed direction (dot-and-dash line arrow) is obtained.

Of course, the main distributing device has been simplified on the drawing and it may be modified in particular as shown by the abovementioned patent applications.

Now, according to the present invention, there is provided an auxiliary distributing device 62 diagrammatically illustrated by a block rectangle on FIG. 9 and shown in detailed fashion on FIGS. 10 and 11. This auxiliary device is independent of the main distributing valve device and, according to its position, it is capable of connecting the main distributing device with the pump (position I) or to cut it off from the pump while connecting the two chambers 11 and 12 of the jack with return conduit means (position II) whatever be the position of the slide valve 55 of the main distributing device.

This auxiliary device is essentially constituted by a slide valve 63 movable inside housing 64 by means of a lever 23.

The two portions of delivery conduit 17 located respectively upstream and downstream of distributing valve device 15 open into housing 64 at points such that, in position I of valve member 63, these two portions of conduit 17 communicate together (FIG. 10) through a groove 63a, whereas in position II, they are cut off from each other by slide valve 63 (FIG. 11).

Two conduits 18a and 19a, connected in parallel with conduits 18 and 19 respectively, open into housing 64 at points such that they are both closed by valve 63 in position I (FIG. 10) but are connected together and also to the upstream portion of the delivery conduit 17 and to a return conduit 24 through central passage 26 and orifices 65, 66, 67 in position II (FIG. 11). The last mentioned orifice, to wit 67, is closed when piston valve 63 is in position I (FIG. 10) but is placed in communication with a return conduit 24 through a valve 68 when said piston valve 63 is in position II (FIG. 11).

In order to locally throttle the discharge passage constituted by groove 68 and conduit 24, it is advantageous to provide notches 38 of gradually varying cross section in the portion 39 of piston valve 63 which cooperates with a portion of the same diameter 68a of housing 64. Thus, when piston valve 63 is moved toward the right beyond the position of FIG. 11, the passage afforded to the liquid delivered from the pump and flowing between parts 38 and 68a is gradually reduced. This causes the pressure to rise in conduits 18a and 19a and consequently in the chambers 11 and 12 of the jack. As the active area of chamber 11 is greater than that of chamber 12, there is thus produced a thrust on piston 8 in the lifting direction, that is to say in that corresponding to load shifting.

In order to limit the pressure established in the jack chambers to a value lower than that which causes the plough to be lifted, there is provided, in parallel with the throttling section 39—68a, a passage including a calibrated orifice controlled in such manner by valve member 63 that it is closed when said valve member 63 is in position I (FIG. 10) but opened for all other positions of valve member 63 (FIG. 11).

For this purpose, said passage is constituted by a channel 69 provided inside valve member 63 and separate from passage 26, this channel 69 being in permanent communication with return conduit 24 and opening, opposite groove 68, through a calibrated orifice 70, into a groove 71 preferably provided over only a portion of the periphery of valve member 63.

It will be seen that when valve member 63 is in position I, as shown by FIG. 10 (the main distributing valve device 15 being in action), groove 68 is cut off from passage 26, so that no liquid can flow through channel 69. But when valve member 63 is in poistion II, as shown by FIG. 11, the liquid from the pump escapes in parallel both through the passage between surfaces 39 and 68a and through passage 69 (as illustrated by the arrows). When valve member 63 is moved toward the right from the position shown by the FIG. 11, the section afforded by the first of said passages toward conduit 24 decreases gradually until it becomes zero. The liquid discharge from the pump then escapes exclusively through orifice 70 and channel 69 and the load shifting pressure thus reaches a maximum value, which depends upon the dimensions of orifice 70.

It should further be noted that calibrated orifice 70 is not necessarily provided in the valve member 63 of distributing device 62.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. For use with a tractor having a frame and provided with an implement pivotally connected with said frame about a horizontal axis, a hydraulic control system for at least lifting said implement, which system comprises in combination, a hydraulic jack interposed between said frame and said implement, said jack having a chamber the expansion of which causes said jack to lift the implement, a liquid tank, a continuously working pump having its input connected with said tank, a delivery conduit leading from the output of said pump, a discharge conduit, means for connecting both said jack chamber and said delivery conduit with said discharge conduit, weight transfer rigid means for throttling said discharge conduit to produce in said jack chamber a pressure capable of transferring to said tractor frame a portion of the load of said implement, a control member, positive means for operatively connecting said weight transfer throttling means with said control member for moving the throttling means in a direction to increase the throttling effect thereof, and means for limiting the pressure in the portion of said discharge conduit upstream of said weight transfer throttling means to a value lower than that necessary in said jack chamber to cause lifting of said implement by said jack.

2. A hydraulic control system according to claim 1 in which said last mentioned means consist of a spring loaded valve inserted between said discharge conduit portion and the outside.

3. A hydraulic control system according to claim 1 in which said last mentioned means consist of a passage of restricted cross section connecting said discharge conduit portion with the outside.

References Cited in the file of this patent

UNITED STATES PATENTS

| Re. 24,006 | Acton | May 24, 1955 |
| 2,677,322 | Bunting | May 4, 1954 |
| 2,750,862 | Garmager | June 19, 1956 |

FOREIGN PATENTS

| 529,000 | Canada | Aug. 14, 1956 |
| 747,674 | Great Britain | Apr. 11, 1956 |